(12) United States Patent
Crisan

(10) Patent No.: US 8,760,425 B2
(45) Date of Patent: Jun. 24, 2014

(54) METHOD AND APPARATUS FOR ENABLING TOUCHPAD GESTURES

(75) Inventor: Adrian Crisan, San Diego, CA (US)

(73) Assignee: Sony Corporation, Tokyo (JP)

(*) Notice: Subject to any disclaimer, the term of this patent is extended or adjusted under 35 U.S.C. 154(b) by 189 days.

(21) Appl. No.: 13/425,239

(22) Filed: Mar. 20, 2012

(65) Prior Publication Data
US 2013/0249806 A1 Sep. 26, 2013

(51) Int. Cl.
*G06F 3/041* (2006.01)

(52) U.S. Cl.
USPC .......................................... 345/173; 715/863

(58) Field of Classification Search
CPC ... G06F 3/044; G06F 3/0488; G06F 3/03547; G06F 3/04883; G06F 3/04886; G06F 3/041; G06F 2203/04808; G06F 3/0485
USPC .................... 345/173–178; 178/18.01–18.11; 715/863
See application file for complete search history.

(56) References Cited

U.S. PATENT DOCUMENTS

| | | | |
|---|---|---|---|
| 2009/0231285 A1* | 9/2009 | Duncan et al. | 345/173 |
| 2010/0302172 A1* | 12/2010 | Wilairat | 345/173 |
| 2012/0056836 A1* | 3/2012 | Cha et al. | 345/173 |
| 2012/0131519 A1* | 5/2012 | Jitkoff | 715/863 |
| 2012/0154303 A1* | 6/2012 | Lazaridis et al. | 345/173 |
| 2013/0124872 A1* | 5/2013 | Shen et al. | 713/189 |
| 2013/0154959 A1* | 6/2013 | Lindsay et al. | 345/173 |

OTHER PUBLICATIONS

Kevin Parrish, "BlueStacks has launched an Android app "player" that allows users to run Android-based apps within a Windows 7 environment", published Jun. 17, 2012, downloaded from: http://www.tomshardware.com/news/BlueStacks-Cloud-connect-App-Player-Gingerbread-Honeycomb.13677.html, 6 pages.

Joshua Topolsky "Windows Phone 7 Review", published Oct. 20, 2010, downloaded from: http://www.engadget.com/2010/10/20/windows-phone-7-review/, 18 pages.

"Method for a Touch Based Dynamic GUI", published Jun. 17, 2002, downloaded from: http://ip.com/IPCOM/000008489, 5 pages.

* cited by examiner

*Primary Examiner* — Hong Zhou
(74) *Attorney, Agent, or Firm* — Moser Taboada

(57) ABSTRACT

A method for touchpad edge gesture detection comprising detecting touch input on a touchpad, determining if the touch input originates externally to the touchpad, determining if the touch input ends internally to the touchpad and performing a command on a computer corresponding to the touch input.

18 Claims, 5 Drawing Sheets

METHOD AND APPARATUS FOR ENABLING TOUCHPAD GESTURES

BACKGROUND

1. Field of the Invention

Embodiments of the present invention generally relate to gesture detection and, more particularly, to a method and apparatus for enabling touchpad gestures.

2. Description of the Related Art

As tablet computers come into general usage, many of the modes of interaction featured in notebook and desktop computers begin to seem outdated and tedious. Tablet computers allow a user to make motion gestures on its displays surface (i.e. a touch screen). Specifically, tablet computers using Microsoft Windows 8 operating system allow gestures and swipes on the touch screen to trigger a preconfigured menu system. Such gestures and swipes allow users quick access to commonly used features.

In contrast, notebook computers often have touch mouse pads, or touchpads, and keyboards as primary means of interacting with the underlying operating system in the notebook. In order to access commonly used features such as control panels and computer configurations, notebook users must open the Start menu, find the control panels icon, launch dedicated applications and wade through dozens of windows in the control panel to modify a particular setting. Such navigation becomes tedious and a user is required to memorize where a particular setting is modified in order to access the setting quickly. In some situations, there are applications that are used very often and searching for the particular icon by navigating to it using a touchpad to translate the cursor and double clicking on the icon by tapping the touchpad.

This interaction model creates an awkward and cumbersome mechanism for enabling users to launch oft-used software applications and application functions. It would be desirable to have the touch screen functionality of tablet computers integrated with notebook computers, where touch gestures may launch applications or modify control settings according to a gesture sensed by a touch screen associated with the notebook. However, notebook computers are often in the low-cost price range and expensive touch screens would place them out of their particular market. Therefore, notebooks must use their existing interface devices such as touchpads as a means of easier interaction with the operating system.

Therefore, there exists a need to provide a method and apparatus for touchpad edge gesture detection.

SUMMARY OF THE INVENTION

Embodiments of the present disclosure generally include a method for touchpad edge gesture detection comprising detecting touch input on a touchpad beginning from a first point outside a border of the touchpad to a second point inside the border of the touchpad, interpreting the input as a touch gesture, and performing a command on a computer corresponding to the touch gesture.

Embodiments of the present disclosure generally include an apparatus comprising a touchpad with a border for detecting touch input from a first point outside the border to a second point inside the border of the touchpad, a gesture detection module for interpreting the input as a touch gesture, and a command module for performing a command on a computer corresponding to the touch gesture.

Embodiments of the present disclosure further include a method for touchpad edge gesture detection comprising detecting touch input on a touchpad, extracting first velocity information corresponding to a first data point in the input, and executing a command if the velocity is greater than a threshold velocity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As explained further below, various embodiments of the invention disclose a method and apparatus for providing touchpad edge gesture detection. In one embodiment, a computer with a touchpad surface detects a touch gesture on its touchpad, and infers that the touch gesture starts from outside a border of the touchpad and ends at a point inside the border of the touchpad. This is inferred by determining that the velocity of the gesture when entering the touchpad is non-zero or greater than a particular threshold velocity. If such a gesture is detected, a command module executes a command corresponding to the detected gesture. The command is preconfigured to display, for example, a taskbar, modify the power mode, launch an application, or the like.

Figure 1:
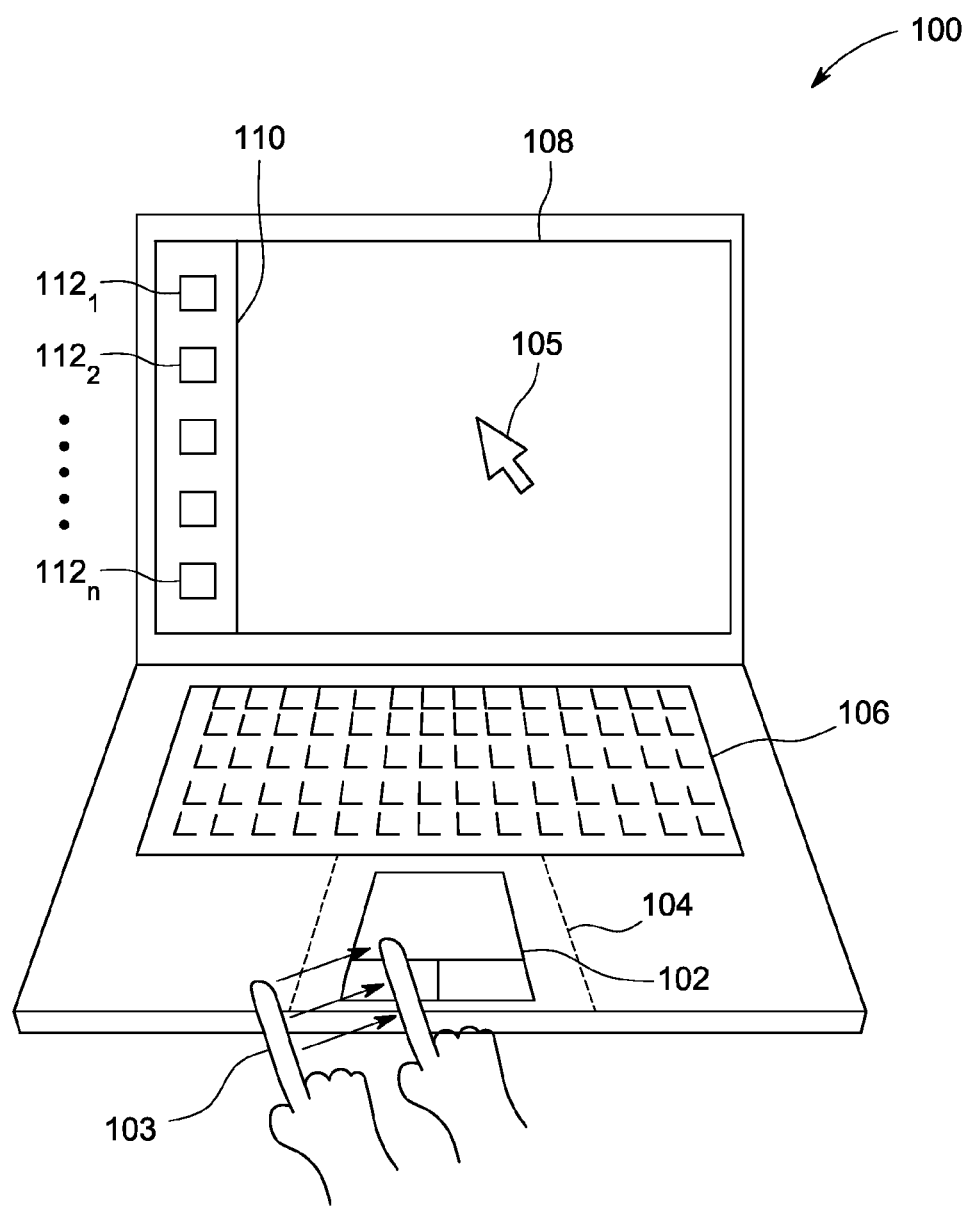
FIG. 1 is an illustration depicting usage of a notebook computer in accordance with exemplary embodiments of the present invention.

FIG. 1 is an illustration depicting usage of a notebook computer 100 in accordance with exemplary embodiments of the present invention. The notebook computer 100 comprises a touchpad 102, a neutral zone 104, a keyboard 106 and a display 108. The display 108 displays a taskbar 110 with icons $112_{1...n}$. A user of the computer system 100 uses his or her finger 103 to input mouse and cursor 105 movement controls into the touchpad 102. The touchpad 102 interacts with an Operating System executing on the computer system 100 to move the cursor 105 across the display 108. In this embodiment, an input originating from an area within the touchpad 102 and ending an area within the touchpad 102 is regarded as an instruction to move the cursor 105. The neutral zone 104 is an undistinguished area surrounding the touchpad, where a user may begin a gesture motion. The neutral zone 104 is outlined by a dotted-line for purposes of illustrating an area outside the touchpad where a gesture may begin and is not a physically defined area in a notebook computer. If a gesture input is captured, where it is determined that the velocity of the swiping motion is greater than a threshold value at a border of the touchpad, the taskbar 110 is commanded to appear on display 110. According to one embodiment, the taskbar 110 is located on the left side of the display 108, extending from the top to the bottom of the display 108. In other embodiments, the taskbar is located in other areas of the screen and the location is determined according to user preference. The taskbar 110 may optionally contains icons $112_{1...n}$ for various settings, applications, commands and the like.

Figure 2:
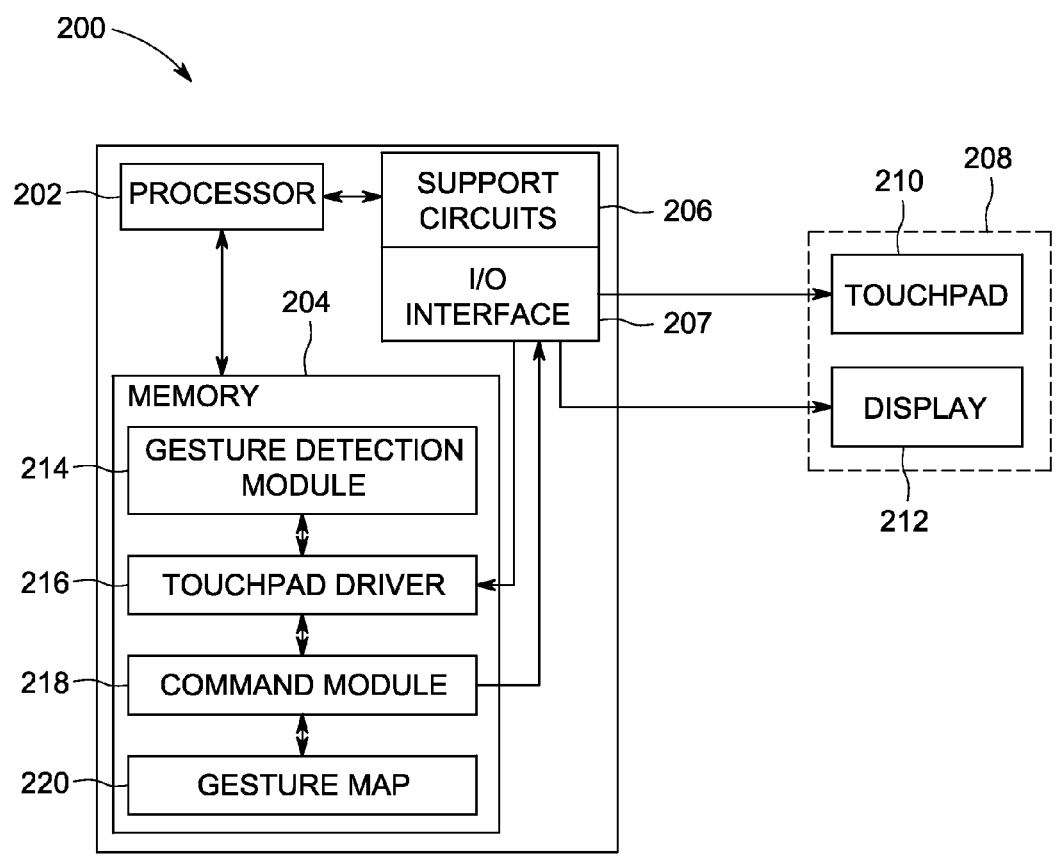
FIG. 2 is a block diagram of a computer system in accordance with exemplary embodiments of the present invention.

FIG. 2 is a block diagram of a computer system 200 in accordance with exemplary embodiments of the present invention. The computer system 100 includes a processor 202, a memory 204 and various support circuits 206. The processor 202 may include one or more microprocessors known in the art, and/or dedicated function processors such as field programmable gate arrays programmed to perform dedicated processing functions. The support circuits 206 for the processor 202 include microcontrollers, application specific integrated circuits (ASIC), cache, power supplies, clock circuits, data registers, I/O interface 207, and the like. The I/O interface 207 may be directly coupled to the memory 204 or coupled through the supporting circuits 206. The I/O interface 207 may also be configured for communication with input devices and/or output devices 208, such as, network devices, various storage devices, mouse, keyboard, displays, sensors and the like. In an exemplary embodiment, the devices 208 comprise at least a touchpad 210 for detecting touch input and a display 212.

Figure 3:
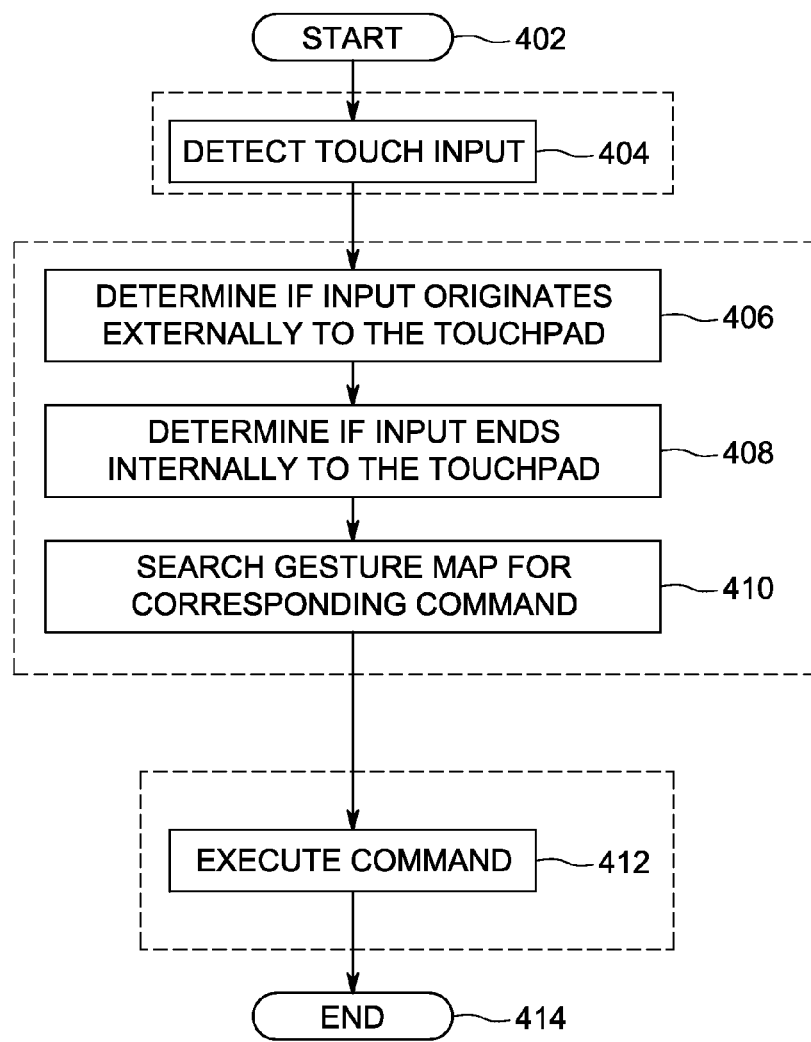
FIG. 3 is a flow diagram of a method for touch pad edge gesture detection in accordance with embodiments of the present invention.

The memory 204 stores non-transient processor-executable instructions and/or data that may be executed by and/or used by the processor 202. These processor-executable instructions may comprise firmware, software, and the like, or some combination thereof. Modules having processor-executable instructions that are stored in the memory 204 comprise the gesture detection module 214, the touchpad driver 216 and the command module 218. Further, the memory 204 stores the gesture map 220. Operation and function of the executable instructions and use of the gesture map 220 are described in detail below. In an exemplary embodiment, the memory 204 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like FIG. 3 is a flow diagram of a method 400 in accordance with a generalized embodiment of the present invention. The method 400 is an exemplary implementation of the gesture detection module 214, the touchpad driver 216 and the command module 218 as interpreted by the computer apparatus 200 and executed by the processor 202. The method begins at step 402 and then proceeds to step 404. At method 406, the touchpad driver 216 detects touch input from the user of the apparatus 100. At step 406, the touchpad driver 216 relays the touch input as a series of points to the gesture detection module 214, which determines if the input originates externally to the touchpad, as detailed below in FIG. 6. At step 408, the gesture detection module 214 determines if the input ends internally to the touchpad, i.e., is within the border of the touchpad. At step 410, if the input originates outside the touchpad and ends inside the touchpad border, then a gesture map is searched to find a command that corresponds to the particular "gesture" input. For example, a user may make a swipe gesture starting in the top left corner of the neutral zone 104 and ending in the center point of touchpad 102. This swipe gesture may indicate that the taskbar 110 should be displayed on the display 108. See FIG. 4 for further examples of gesture types, though the present invention is not limited to those gestures shown in FIG. 4. At step 412 the command "display taskbar" is executed by the command module 218. The method ends at step 414.

Figure 4:
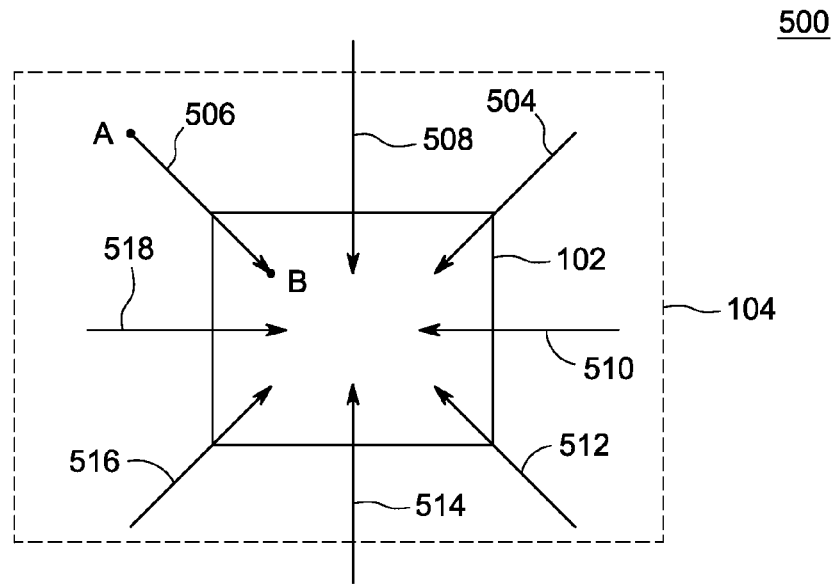
FIG. 4 is an illustration of touchpad gestures in accordance with embodiments of the present invention.

FIG. 4 is an illustration 500 of touchpad gestures in accordance with embodiments of the present invention. One of ordinary skill in the art would recognize that various other gestures are configurable and those depicted are only shown as examples, and that a multitude of user-generated gestures are also configurable for launching software applications or application functions. The figure depicts several different touchpad gestures a user may input on touchpad 102 and neutral zone 104. As shown in the Figure, touch pad gestures originate in the neutral zone 104. The neutral zone is simply any area outside of the touchpad 102, however, in the figure the neutral zone is shown as a particular area enclosed by a dotted line, indicating the area immediately outside of the touchpad 102. The depicted gestures are Gesture 505, 506, 508, 510, 512, 514, 516 and 518. Point A is in the neutral zone 104 and point B is on the touchpad 102. Gesture 506 may correspond to a particular command execution such as "display taskbar." For a further list of gestures and their corresponding commands, see FIG. 5. Gesture 506, for example, starts at point A and ends at point B. According to an exemplary embodiment, there are many more intermediate swipe actions where angle of the swipe motion and end point of the swipe motion are differentiated. For example, a gesture may begin below the top left corner of the neutral zone 104, enter the touchpad 102 substantially close to the center of the left edge of the touchpad 102 and end near the bottom right corner inside the touchpad 102. This gesture may invoke the command to "minimize all open windows" or the like.

Figure 5:
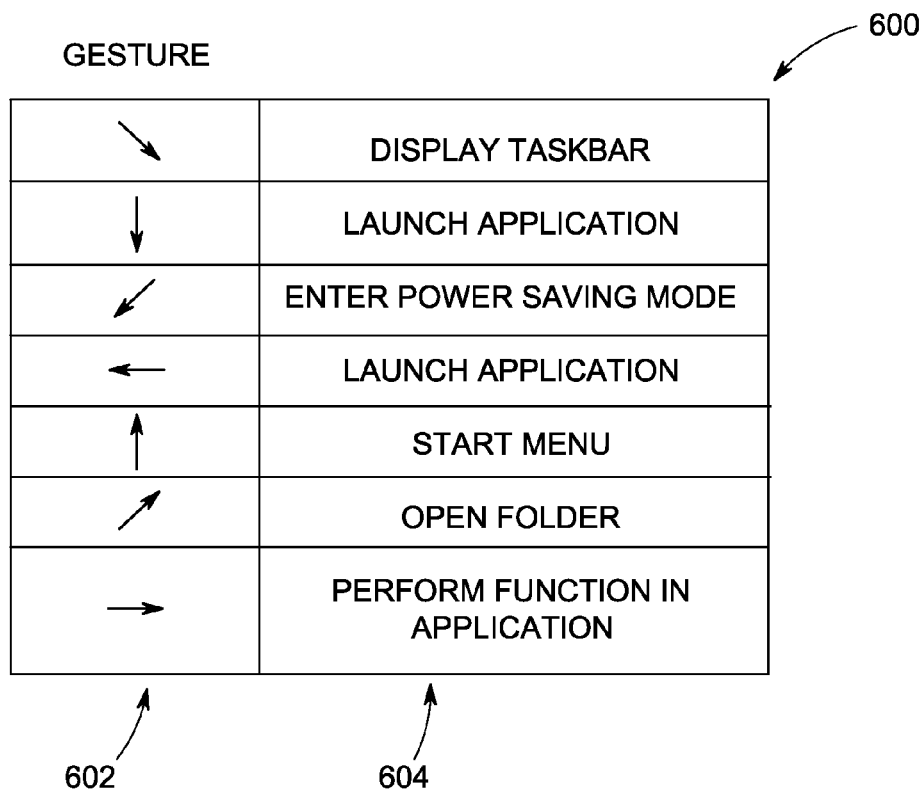
FIG. 5 is a table associating gestures from FIG. 4 with commands in accordance with embodiments of the present invention.

FIG. 5 is a table associating exemplary gestures from FIG. 4 with exemplary commands in accordance with embodiments of the present invention. Column 602 indicates a gesture and column 604 shows the associated command. In one example, gesture 506 from FIG. 4 is associated with displaying taskbar 110 on display 108. The gesture 508 is associated with launching a particular application, configurable by a user of the system 100. In an exemplary embodiment, the application is a web-browser, a word processor, an email application, or the like. Gesture 504 is associated with entering the computer 100 into a particular power saving mode, adjusting the brightness or the like. Gesture 514 is associated with opening the start menu for the Operating System, in this embodiment, Microsoft Windows 8. Gesture 516 may open a particular folder used often by the user and gesture 518 may execute a particular command inside of an application such as going forward or backward in a web-site. The command to gesture mapping is configurable by the user of the system 100 to associate user-generated swipe motions with user-assigned commands and task executions.

Figure 6:
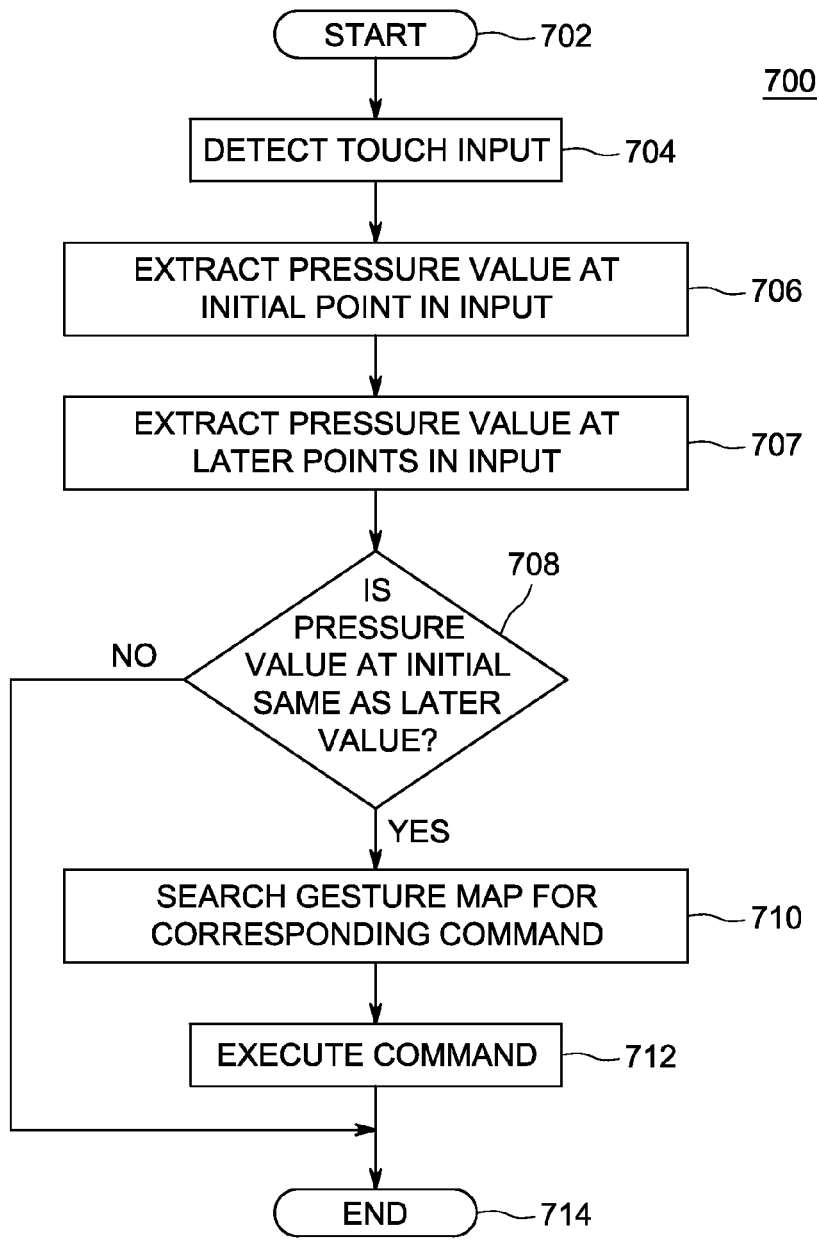
FIG. 6 is a flow diagram of a method for tough pad edge gesture detection in accordance with embodiments of the present invention.

FIG. 6 is a flow diagram of a method 700 for executing a command according to a user's edge gesture in accordance with an alternate embodiment of the present invention. The method 700 is an exemplary implementation of the gesture detection module 214, the touchpad driver 216 and the command module 218 as interpreted by the computer apparatus 200 and executed by the processor 202. The method begins at step 702 and then proceeds to step 704. At method 704, the gesture detection module 214 detects touch input from the user of the apparatus 100. At step 706, the gesture detection module 214 extracts the pressure of the first touch input at the touchpad edge constituting the first data point of the input, i.e., the edge formed between the neutral zone 104 and the touchpad 102 of FIG. 1. At step 707, the method extracts a plurality of pressure value of the touch input, constituting data points after the initial touch input in the input gesture, i.e., when user's finger 103 leaves the touchpad 102 and enters the neutral zone 104. At step 708, the method determines if the pressure value of the initial touch point is equal to the pressure value of the later touch points, i.e., if the touch input was initiated outside of the touchpad. At step 710, if the pressure value is steady, a gesture map is searched to find a command that corresponds to the particular "gesture" input. If the pressure value is not steady the method ends. At step 712, if the gesture map contains a similar gesture input entry as the one input by the user, the corresponding command is executed, e.g., displaying a taskbar 110. The method ends at step 714. According to other embodiments, the velocity of the user's swipe motion is determined by the touchpad driver 216 and if the velocity at the initially sensed touch point is greater than a threshold value, it is inferred that the gesture originated outside of the touchpad 102.

According to further embodiments of the present invention, the gesture map depicted in FIG. 5 accounts for particular velocities of the user's swipe motion and particular pressure value profiles of a user's swipe motion. For example, if the user quickly swipes across the touchpad 102, the desktop can be shown, or if a user increases pressure at the end of the touch input, all open windows are closed. The user configures the gesture map in a customized way according to his or her usage patterns such that particular wipes that he or she uses are prioritized and the like. A manufacturer of the computer 100 can pre-configure gesture swipes and a user may add more gesture swipes as part of a software package.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

The invention claimed is:

1. A method for touchpad edge gesture detection comprising:
    detecting touch input on a touchpad;
    determining if the touch input originates externally to the touchpad by
        interpreting the touch input as a plurality of data points;
        extracting a first pressure value at an initial data point in the plurality of points;
        extracting an average pressure value at a remainder of the data points in the plurality of data points; and
        determining if the first pressure value and the average pressure value are equal within a predetermined threshold;
    determining if the touch input ends internally to the touchpad; and
    performing a command on a computer corresponding to the touch input.

2. The method of claim 1 wherein the command controls a display to show a menu of icons on a computer display.

3. The method of claim 2 wherein the menu appears in a preconfigured location on the display.

4. The method of claim 2 wherein the display is remote from the touchpad.

5. The method of claim 1 wherein the command sets the computer in a particular power mode.

6. The method of claim 1 wherein the determining if the touch input originates externally to the touchpad comprises:
    determining, a plurality of positions of each of a plurality of data points in the touch input;
    extrapolating a velocity of a data point corresponding to a first detected touch input;
    performing the command when the velocity is above a predetermined threshold.

7. The method of claim 6 wherein the performed command corresponds to the velocity of the touch input.

8. The method of claim 1 further comprising configuring a plurality of commands corresponding to a plurality of touch inputs.

9. The method of claim 1 wherein the command is performed on Windows 8 operating system.

10. An apparatus comprising:
    a touchpad with a border for detecting touch input;
    a gesture detection module for determining if the touch input originates externally to the touchpad by: interpreting the touch input as a plurality of data points, extracting a first pressure value at an initial data point in the plurality of points, extracting an average pressure value at a remainder of the data points in the plurality of data points and determining if the first pressure value and the average pressure value are equal within a predetermined threshold, and wherein the gesture detection module is configured for determining if the touch input ends internally to the touchpad; and
    a command module for performing a command on a computer corresponding to the touch input.

11. The apparatus of claim 10 wherein the command module controls a display to show a menu of icons on a computer display.

12. The apparatus of claim 11 wherein the menu appears in a preconfigured location on the display.

13. The apparatus of claim 11 wherein the display is remote from the touchpad.

14. The apparatus of claim 10 wherein the command from the command module sets the computer in a particular power mode.

15. The apparatus of claim 10 wherein the gesture detection module further determines a plurality of positions of each of a plurality of data points in the touch input and extrapolates a velocity of a data point corresponding to a first detected touch input.

16. The apparatus of claim 15 wherein the performed command corresponds to the velocity of the touch input.

17. The apparatus of claim 10 further comprising configuring a plurality of commands corresponding to a plurality of touch inputs.

18. The apparatus of claim 10 wherein the apparatus uses Windows Mobile 8 operating system.

* * * * *